US011413909B2

(12) United States Patent
Akashi

(10) Patent No.: US 11,413,909 B2
(45) Date of Patent: Aug. 16, 2022

(54) PNEUMATIC TIRE

(71) Applicant: The Yokohama Rubber Co., LTD., Tokyo (JP)

(72) Inventor: Yasutaka Akashi, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 84 days.

(21) Appl. No.: 16/069,756

(22) PCT Filed: Jan. 12, 2017

(86) PCT No.: PCT/JP2017/000871
§ 371 (c)(1),
(2) Date: Jul. 12, 2018

(87) PCT Pub. No.: WO2017/122741
PCT Pub. Date: Jul. 20, 2017

(65) Prior Publication Data
US 2019/0023082 A1    Jan. 24, 2019

(30) Foreign Application Priority Data
Jan. 12, 2016  (JP) .............................. JP2016-003415

(51) Int. Cl.
*B60C 15/04*    (2006.01)
*B60C 9/04*    (2006.01)

(52) U.S. Cl.
CPC ...... *B60C 15/04* (2013.01); *B60C 2009/0425* (2013.01); *B60C 2015/048* (2013.01); *B60C 2200/06* (2013.01)

(58) Field of Classification Search
CPC .......... B60C 2200/06; B60C 2200/065; B60C 2200/08; B60C 2015/042;
(Continued)

(56) References Cited

U.S. PATENT DOCUMENTS 4,023,608 A * 5/1977 Meiss ................. B60C 17/0009
152/546
4,216,814 A * 8/1980 Grosch ................. D07B 1/062
152/540
(Continued)

FOREIGN PATENT DOCUMENTS

DE    102015207714 A1 * 10/2016    ......... B60C 15/0018
JP    S61-088804    6/1986
(Continued)

OTHER PUBLICATIONS

Nakane Shinsuke, WO-2012114667-A1, machine translation. (Year: 2012).*

(Continued)

*Primary Examiner* — Robert C Dye
*Assistant Examiner* — Sedef E Paquette
(74) *Attorney, Agent, or Firm* — Thorpe North & Western

(57)    ABSTRACT

A pneumatic tire includes a bead core including circumferential portions made of metal wire bundled in rows disposed at each bead portion; and a carcass layer turned up at end portions around the bead cores from a tire inner side to an outer side; the bead cores including at least two central layers centrally located in a tire radial direction, at least one upper layer outward of the central layers in the radial direction, and at least one lower layer inward of the central layers in the radial direction; a number of the circumferential portions made of metal wire in the central layers is equal to each other and a maximum value; and a number of the circumferential portions made of metal wire in the upper layer(s) and the lower layer(s) being reduced by one from the maximum value for each layer away from the central layers.

3 Claims, 4 Drawing Sheets

(58) Field of Classification Search
CPC ........ B60C 2015/046; B60C 2015/048; B60C 2009/0425; B60C 15/00; B60C 15/04; B29D 30/48; B29D 2030/487; B29D 2030/485; B21F 37/00
USPC .................................. 152/539, 540; 156/136
See application file for complete search history.

(56) References Cited

U.S. PATENT DOCUMENTS

| | | | | |
|---|---|---|---|---|
| 2001/0050128 | A1* | 12/2001 | Ohara | B60C 1/0008 |
| | | | | 152/540 |
| 2003/0106627 | A1* | 6/2003 | Tonezzer | B60C 3/04 |
| | | | | 152/531 |
| 2005/0252594 | A1* | 11/2005 | Suzuki | B60C 15/04 |
| | | | | 152/540 |
| 2011/0056607 | A1* | 3/2011 | Yamazaki | B60C 15/04 |
| | | | | 152/540 |
| 2013/0133806 | A1* | 5/2013 | Amano | B60C 15/0018 |
| | | | | 152/541 |
| 2013/0139943 | A1* | 6/2013 | Todoroki | B60C 15/04 |
| | | | | 152/541 |
| 2015/0075691 | A1* | 3/2015 | Merino Lopez | B60C 19/12 |
| | | | | 152/502 |
| 2015/0129101 | A1* | 5/2015 | Koide | D02G 3/48 |
| | | | | 152/556 |
| 2015/0239299 | A1 | 8/2015 | Sakamoto et al. | |
| 2016/0243901 | A1 | 8/2016 | Tatsumi | |
| 2018/0134100 | A1* | 5/2018 | Kawaguchi | B60C 9/08 |

FOREIGN PATENT DOCUMENTS

| | | | | |
|---|---|---|---|---|
| JP | 02256503 | A * | 10/1990 | ............ D07B 1/062 |
| JP | H07-223412 | | 8/1995 | |
| JP | 09254611 | A * | 9/1997 | |
| JP | 2001-055022 | | 2/2001 | |
| JP | 2002-002214 | | 1/2002 | |
| JP | 2010-000827 | | 1/2010 | |
| JP | 2010-173437 | | 8/2010 | |
| JP | 2012-188016 | | 10/2012 | |
| JP | 2012-218552 | | 11/2012 | |
| JP | 2014-117978 | | 6/2014 | |
| JP | 2014-198565 | | 10/2014 | |
| JP | 2015-131523 | | 7/2015 | |
| JP | 2015-157599 | | 9/2015 | |
| KR | 10-2011-0064550 | | 6/2011 | |
| WO | WO-2012114667 | A1 * | 8/2012 | ............ B60C 1/00 |
| WO | WO 2015/105087 | | 7/2015 | |

OTHER PUBLICATIONS

Shiina et al., JP 09-254611, machine translation. (Year: 1997).*
International Search Report for International Application No. PCT/JP2017/000871 dated Apr. 11, 2017, 4 pages, Japan.

* cited by examiner

PNEUMATIC TIRE

TECHNICAL FIELD

The present technology relates to a pneumatic tire that can provide enhanced durability of the carcass layer at the bead portion.

BACKGROUND ART

A known pneumatic tire includes a bead core including a plurality of metal wires bundled in rows at each of a pair of bead portions and has a structure in which both end portions of a carcass layer are turned up and around the bead cores from the tire inner side to the outer side. In tires for a passenger vehicle, typically a bead core with a quadrangular cross-sectional shape is employed (for example, see Japan Unexamined Patent Publication Nos. 2014-117978 and 07-223412), and in heavy duty tires for a light truck, typically a bead core with a hexagonal cross-sectional shape is employed (for example, see Japan Unexamined Patent Publication Nos. 2014-198565, 2012-218552 and 2012-188016).

There have been attempts to reduce costs in tires for a light truck by employing a carcass cord with more fineness and higher strength than existing carcass cords to enable a carcass structure of two-ply rather than three-ply. When a two-ply carcass structure is employed with a typical bead core with a quadrangular or hexagonal cross-sectional shape, when the tire rolls under a load, the stress on the carcass layer concentrates at the bead portion, in particular at the corner portion of the bead core, which is susceptible to stress concentration. This may lead to failure of the carcass cords, and thus a reduction in the durability of the carcass layer at the bead portion.

SUMMARY

The present technology provides a pneumatic tire that can provide enhanced durability of the carcass layer at the bead portion.

A pneumatic tire includes:

a bead core including a plurality of circumferential portions made of metal wire bundled in rows disposed at each of a pair of bead portions; and a carcass layer which at both end portions are turned up and around the bead cores from a tire inner side to an outer side;

the bead core including at least two central layers centrally located in a tire radial direction, at least one upper layer located outward of the at least two central layers in the tire radial direction, and at least one lower layer located inward of the at least two central layers in the tire radial direction;

a number of the circumferential portions made of metal wire in the at least two central layers is equal to each other and a maximum value; and a number of the circumferential portions made of metal wire in the at least one upper layer and the at least one lower layer being reduced by one from the maximum value for each layer away from the at least two central layers.

In an embodiment of the present technology, the bead core includes the at least two central layers centrally located in a tire radial direction, the at least one upper layer located outward of the at least two central layers in the tire radial direction, and the at least one lower layer located inward of the at least two central layers in the tire radial direction; the number of the circumferential portions made of metal wire in the at least two central layers is equal to each other and the maximum value; and the number of the circumferential portions made of metal wire in the at least one upper layer and the at least one lower layer being reduced by one from the maximum value for each layer away from the at least two central layers. In this way, the stress on the carcass layer that concentrates at a corner portion of the bead core when the tire rolls under a load can be alleviated, and the stress can be dispersed. As a result, the durability of the carcass layer at the bead portion can be improved.

The carcass layer turned up around the bead cores is preferably a single carcass layer, and a total fineness of carcass cords that compose the carcass layer preferably ranges from 4000 to 5500 dtex. Furthermore, the pneumatic tire described above is preferably a heavy duty tire. In the related art, typically, heavy duty tires are given increased durability of the carcass layer at the bead portion by providing two turned up carcass layers at the bead portion. However, by using a carcass cord with high total fineness and the bead core structure according to an embodiment of the present technology described above, the durability of the carcass layer at the bead portion can be maintained and the number of turned up carcass layers can be reduced, thus enhancing cost performance.

The number of circumferential portions made of metal wire in the at least two central layers preferably ranges from four to seven, and a number of layers of the bead core in the tire radial direction preferably ranges from four to seven. This can provide good durability of the carcass layer at the bead portion and cost performance in a compatible manner.

DETAILED DESCRIPTION

Figure 1:
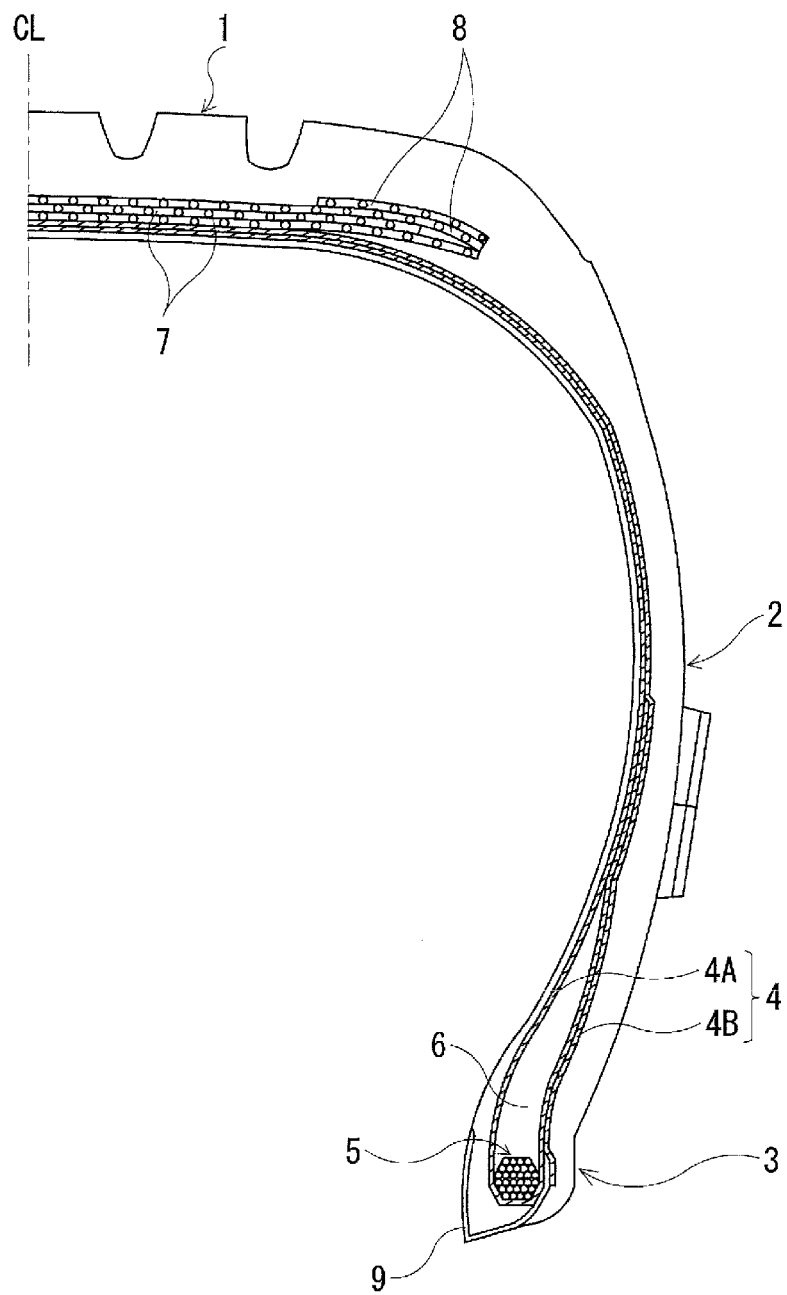
FIG. 1 is a meridian cross-sectional view illustrating a pneumatic tire according to an embodiment of the present technology.
Figure 2:
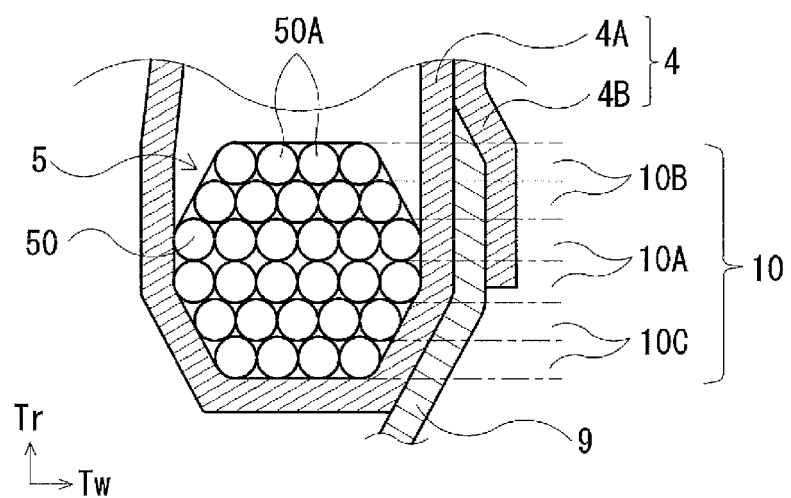
FIG. 2 is a cross-sectional view illustrating a bead core of a pneumatic tire according to an example of the present technology.

The configuration of the present technology is described in detail below with reference to the accompanying drawings. FIGS. 1 and 2 illustrate a pneumatic tire according to an embodiment of the present technology. Note that in FIG. 1, CL denotes the tire center line.

As illustrated in FIG. 1, a pneumatic tire of the present embodiment includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 including a plurality of carcass cords that extend in the tire radial direction is mounted between the pair of bead portions 3, 3. The carcass layer 4 includes an inner carcass layer 4A positioned inward in the tire radial direction in the tread portion 1 and an outer carcass layer 4B positioned outward in the tire radial direction in the tread portion 1. Annular bead cores 5 are embedded within the bead portions 3, and bead fillers 6 made of a rubber composition are disposed on the outer peripheries of the bead cores 5. The inner carcass layer 4A is turned up and around the bead core 5 from the tire inner side to the outer side and is wrapped around the bead core 5 and a bead filler 6. Additionally, the outer carcass layer 4B includes an end portion disposed outward of the turned up portion of the inner carcass layer 4A in the tire axial direction and extends to a position neighboring the bead core 5. Organic fiber cords of nylon, polyester, or the like are preferably used as the carcass cords constituting the carcass layers 4A, 4B. A chafer 9 is disposed in each bead portion 3 and includes an end portion located outward in the tire axial direction disposed between the inner carcass layer 4A and the outer carcass layer 4B and extends to a position neighboring the bead core 5.

A plurality of belt layers 7 are embedded on an outer circumferential side of the carcass layer 4 in the tread portion 1. These belt layers 7 include a plurality of reinforcing cords that are inclined with respect to the tire circumferential direction and the direction of the reinforcing cords of the different layers intersect each other. In the belt layers 7, an inclination angle of the reinforcing cords with respect to the tire circumferential direction ranges from, for example, 10° to 40°. Steel cords are preferably used as the reinforcing cords of the belt layers 7.

For the purpose of improving high-speed durability, at least one layer of a belt cover layer 8 formed by arranging reinforcing cords at an angle of, for example, not greater than 5° with respect to the tire circumferential direction, is disposed on an outer circumferential side of the belt layers 7. The belt cover layer 8 preferably has a jointless structure in which a strip material made from at least a single reinforcing cord laid in parallel and covered with rubber is wound continuously in the tire circumferential direction. The belt cover layer 8 can also be disposed so as to cover the belt layers 7 at all positions along the width direction, or so as to cover only the outer edge portions of the belt layers 7 in the width direction. Nylon, aramid, or similar organic fiber cords are preferably used as the reinforcing cords of the belt cover layer 8.

Note that the tire internal structure described above is exemplary of a pneumatic tire, but is not limited thereto.

FIG. 2 is a diagram illustrating a bead core of a pneumatic tire according to an example of the present technology. As illustrated in FIG. 2, in the pneumatic tire described above, the bead core 5 is made from metal wires 50 wound in the tire circumferential direction. Circumferential portions 50A of the metal wires 50 form a plurality of rows aligned in a tire axial direction Tw and layers 10 overlapped in the tire radial direction Tr.

The bead core 5 is composed of six layers in the tire radial direction, two central layers 10A centrally located in the tire radial direction, two upper layers 10B located outward of the central layers 10A in the tire radial direction, and two lower layers 10C located inward of the central layers 10A in the tire radial direction.

The two central layers 10A have the same number of circumferential portions 50A made of metal wire, and the number of the circumferential portions 50A made of metal wire in the two central layers 10A is the maximum value (N) out of all of the layers that compose the bead core 5. The number of the circumferential portions 50A made of metal wire in the upper layers 10B and the lower layers 10C is reduced by one from the maximum value (N) for each layer away from the central layers 10A.

In other words, for each layer, the number of the circumferential portions 50A made of metal wire is the maximum value (N) six for the central layers 10A, five for the upper layer 10B and lower layer 10C adjacent to the central layers 10A, and four for the upper layer 10B and lower layer 10C of the layers 10 located at either end in the tire radial direction. In this way, the bead core 5 is given a substantially octagonal cross-sectional shape.

With known configurations in which the bead core 5 has a quadrangular cross-sectional shape (see FIG. 3) or the bead core 5 has a hexagonal cross-sectional shape (see FIG. 4), the corner portion of the bead core 5 (the dashed line section of FIGS. 3 and 4) is where the carcass cord and the bead core 5 come into contact, and stress on the carcass layer 4 is likely to concentrate at the corner portion of the bead core 5. This may lead to failure of the carcass layer 4.

In contrast, in the bead core 5 of a pneumatic tire according to an embodiment of the present technology, the two central layers 10A are adjacent to one another, and the circumferential portions 50A made of metal wire of the two are disposed at the same positions in the tire axial direction. In other words, in the two central layers 10A, the outer edges of the circumferential portions 50A made of metal wire located at both end portions in the tire axial direction are aligned in the tire radial direction. This allows the region where the carcass cords and the bead core 5 come into contact to have a flat shape. In this way, the stress on the carcass layer 4 that concentrates at the region where the carcass cords and the bead core 5 come into contact can be alleviated, and the stress can be dispersed. As a result, the durability of the carcass layer 4 at the bead portion 3 can be improved.

Additionally, in the pneumatic tire described above, one carcass layer 4 is turned up around the bead core 5, and the total fineness of the carcass cords that compose the carcass layer 4 ranges from 4000 to 5500 dtex. Such a pneumatic tire is suitable as a heavy duty tire for a light truck, for example. For a heavy duty tire used under conditions of high internal pressure and high load, such a pneumatic tire can provide maintained durability of the carcass layer 4, a reduced number of turned up carcass layers 4, and enhanced cost performance.

In the pneumatic tire described above, the number of the circumferential portions 50A made of metal wire in the central layers 10A preferably ranges from four to seven, and the number of layers of the bead core 5 in the tire radial direction preferably ranges from four to seven. The number of the circumferential portions 50A made of metal wire more preferably ranges from six to seven, and the number of layers of the bead core 5 in the tire radial direction more preferably ranges from six to seven. This can provide good durability of the carcass layer 4 at the bead portion 3 and cost performance in a compatible manner. When the number of the circumferential portions 50A made of metal wire and the number of layers of the bead core 5 in the tire radial direction is greater than that of the range described above, the cost becomes worse, and when less, the flat regions formed at the bottom surface and the side surfaces of the bead core 5 become narrow, causing the effect of the bead portion 3 of dispersing the stress on the carcass layer 4 to decrease. Furthermore, the safety of the bead itself becomes difficult to ensure.

Note that the embodiment of the present technology described above was described with the bead core 5 having a symmetrical structure about a line in the tire axial direction passing through the center of the bead core 5. However, the structure is not required to be symmetrical about a line in the tire axial direction passing through the center of the bead core 5. In other words, the upper layers 10B and the lower layers 10C may have a different number of layers.

EXAMPLES

Pneumatic tires with a tire size of 235/85R16 and including bead cores including a plurality of circumferential portions made of metal wire bundled in rows at each of a pair of bead portions, both end portions of a carcass layer being turned up and around the bead cores from the tire inner side to the outer side, were manufactured with differing bead core configurations according to Examples 1 and 2.

In Examples 1 and 2, the number of carcass layers, the number of turned up carcass layers, the total fineness of the carcass cords (dtex), the bead core structure, and the bead core cross-sectional shape were set as indicated in Table 1.

Additionally, tires according to Conventional Examples 1 to 3 and Comparative Example 1 were prepared. In the tire according to Conventional Example 1, the number of turned up carcass layers is two, the total fineness of the carcass cords is 3340 dtex, and the bead core has a quadrangular cross-sectional shape. The tire according to Conventional Example 2 has the same structure as that of Conventional Example 1 except that the number of carcass layers is two and the number of turned up carcass layers is one. The tire according to Conventional Example 3 has the same structure as that of Conventional Example 2 except that the bead core has a hexagonal cross-sectional shape. Additionally, the tire according to Comparative Example 1 has the same structure as that of Example 2 except that the bead core has a quadrangular cross-sectional shape.

These test tires were evaluated for durability of the carcass layer at the bead portion and cost according to the following test methods. The results thereof are shown in Table 1.

Durability of Carcass Layer at Bead Portion:

A wheel with a rim size of 16×6.5J was mounted on each of the test tires, and a traveling test was performed using a drum testing machine under the conditions of: a speed of 60 km/h, 130% the maximum air pressure defined by JATMA (Japan Automobile Tyre Manufacturers Association, Inc.), 150% the maximum load defined by JATMA, and a slip angle of 2°. The tires were run until a bead portion failed and the travel distance was measured. Evaluation results are expressed as index values with the value of Conventional Example 1 being assigned as 100. Larger index values indicate superior durability of the carcass layer at the bead portion.

Cost:

The cost of each test tire was calculated. The evaluation results were expressed, using the reciprocal of the calculated value, as index values with the value of Conventional Example 1 being assigned as 100. Larger index values indicate a lower cost.

TABLE 1

Figure 3:
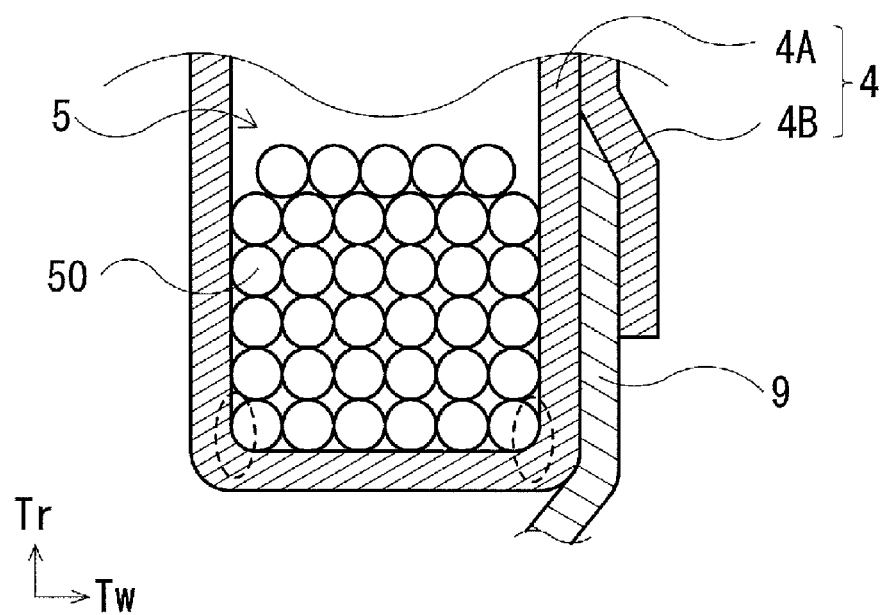
FIG. 3 is a cross-sectional view illustrating a bead core of a pneumatic tire according to a conventional example.
Figure 4:
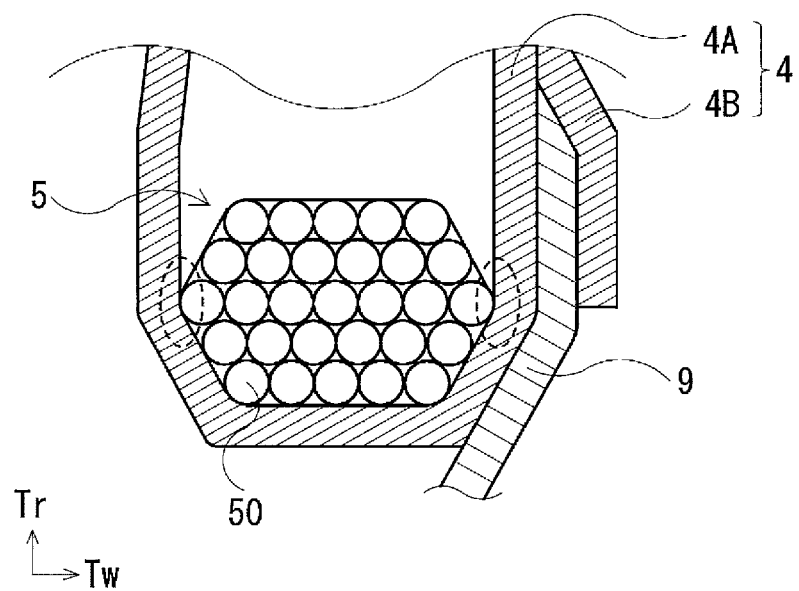
FIG. 4 is a cross-sectional view illustrating a bead core of a pneumatic tire according to another conventional example.

|  | Conventional Example 1 | Conventional Example 2 | Conventional Example 3 | Comparative Example 1 | Example 1 | Example 2 |
|---|---|---|---|---|---|---|
| Number of carcass layers | 3 | 2 | 2 | 2 | 3 | 2 |
| Number of turned up carcass layers | 2 | 1 | 1 | 1 | 2 | 1 |
| Total fineness of carcass cords (dtex) | 3340 | 3340 | 3340 | 4400 | 3340 | 4400 |
| Bead core structure | FIG. 3 | FIG. 3 | FIG. 4 | FIG. 3 | FIG. 2 | FIG. 2 |
| Bead core cross-sectional shape | Quadrangular | Quadrangular | Hexagonal | Quadrangular | Octagonal | Octagonal |
| Durability of carcass layer at bead portion | 100 | 90 | 93 | 95 | 115 | 115 |
| Cost | 100 | 106 | 107 | 105 | 101 | 106 |

As can be seen from Table 1, compared to the pneumatic tire according to Conventional Example 1, the pneumatic tires according to Examples 1 and 2 have both enhanced durability of the carcass layer at the bead portion and cost.

Conventional Example 2 lowered cost with a reduced number of carcass layers and number of turned up carcass layers, however the durability of the carcass layer at the bead portion was greatly degraded. Conventional Example 3 lowered cost with a reduced number of carcass layers and number of turned up carcass layers and included a bead core with a hexagonal cross-sectional shape, however the durability of the carcass layer at the bead portion was degraded. Comparative Example 1 included a bead core with a quadrangular cross-sectional shape. Thus, the durability of the carcass layer at the bead portion was degraded.

The invention claimed is:

1. A pneumatic tire, comprising:
   a bead core comprising a plurality of circumferential portions made of metal wire bundled in rows disposed at each of a pair of bead portions; and
   a carcass layer which at both end portions is turned up and around the bead cores from a tire inner side to an outer side, the carcass layer including at least one inner carcass layer positioned inward in a tire radial direction in a tread portion of the pneumatic tire and an outer carcass layer positioned outward in the tire radial direction in the tread portion, the at least one inner carcass layer being turned up around the bead cores from the tire inner side to the outer side, and the outer carcass layer extending to a position neighboring the bead cores without being wrapped around the bead cores;
   the bead core comprising from six to seven layers including at least two central layers centrally located in the tire radial direction, at least two upper layers located outward of the at least two central layers in the tire radial direction, and at least two lower layers located inward of the at least two central layers in the tire radial direction;

a number of the circumferential portions made of metal wire in each of the at least two central layers is equal to each other and a maximum value, and ranges from six to seven;

a number of the circumferential portions made of metal wire in the at least two upper layers and the at least two lower layers being reduced by one from the maximum value for each layer away from the at least two central layers;

the number of the circumferential portions made of metal wire in each of the at least two central layers being the maximum value out of all of the layers that compose the bead core; and radially adjacent wires of the central layers are disposed at same positions in a tire axial direction such that the radially adjacent wires are aligned in the tire radial direction.

2. The pneumatic tire according to claim 1, wherein the carcass layer turned up around the bead cores is a single carcass layer, and a total fineness of carcass cords that compose the carcass layer ranges from 4000 to 5500 dtex.

3. The pneumatic tire according to claim 2, wherein the pneumatic tire is a heavy duty tire.

* * * * *